United States Patent [19]

Lybarger et al.

[11] 4,089,787

[45] May 16, 1978

[54] INCREASING THE CLAY-DISSOLVING CAPABILITY OF A RELATIVELY HIGH PH SELF-GENERATING MUD ACID

[75] Inventors: James H. Lybarger; Charles C. Templeton; Edwin A. Richardson; Ronald F. Scheuerman, all of Houston, Tex.

[73] Assignee: Shell Oil Company, Houston, Tex.

[21] Appl. No.: 778,296

[22] Filed: Mar. 16, 1977

[51] Int. Cl.$^2$ ............................................. E21B 43/27
[52] U.S. Cl. ................................ 252/8.55 C; 166/307
[58] Field of Search .................... 252/8.55 C, 8.55 B, 252/8.55 R; 166/307

[56] References Cited

U.S. PATENT DOCUMENTS

| 2,335,689 | 11/1943 | Morgan et al. ..................... 252/8.55 |
| 3,142,335 | 7/1964 | Dill et al. .......................... 252/8.55 X |
| 3,826,312 | 7/1974 | Richardson et al. ............ 252/8.55 X |
| 3,828,854 | 8/1974 | Templeton et al. ................. 166/307 |

*Primary Examiner*—Herbert B. Guynn

[57] ABSTRACT

The clay-dissolving capability of a self-generating mud acid comprising an aqueous solution or dispersion of a fluoride salt, an ester of a 1–5 carbon atom aliphatic alcohol and a 2–5 carbon atom fatty acid suitable for use at temperatures exceeding about 180° F is improved by adding an effective amount of an aminopolyacetic acid salt chelating or complexing agent.

3 Claims, 2 Drawing Figures

INCREASING THE CLAY-DISSOLVING CAPABILITY OF A RELATIVELY HIGH PH SELF-GENERATING MUD ACID

BACKGROUND OF THE INVENTION

This invention relates to a well-treating process for dissolving a siliceous material within a well borehole or a subterranean earth formation. More particularly it relates to increasing the amount of siliceous material which can be dissolved and retained in solution by certain high temperature formulations of self-generating mud acid fluids of the type described in the C. C. Templeton, E. H. Street, Jr., E. A. Richardson U.S. Pat. No. 3,828,854. That patent and/or the invention it describes is referred herein as the U.S. Pat. No. 3,828,854 or invention, and the disclosures of the patent are incorporated herein by cross-reference.

In accordance with the U.S. Pat. No. 3,828,854, siliceous materials in or around a well borehole are dissolved by contacting them with an aqueous liquid solution or dispersion of a water-soluble fluoride salt and a relatively slowly reactive acid-yielding material which subsequently converts the salt fluoride solution to a hydrofluoric acid solution which has a relatively high pH but is capable of dissolving siliceous material. The lower aliphatic alcohol esters of formic acid have been used in numerous wells and have proven to be highly satisfactory in reservoirs having temperatures between about 130° and 200° F. For use at higher temperatures a recommended class of acid-yielding material comprises similar alcohol esters of higher molecular weight water-soluble fatty acids. We have now discovered that, although such esters of the higher acids are generally suitable, they provide a level of net dissolved siliceous material (and thus total degree of reservoir permeability improvement) which tends to be significantly less than what is provided by the lower molecular weight acid lower temperature formulation.

The cause of the diminished effectiveness of the self-generating mud acid solutions containing such higher acid esters was not obvious. Prior to the discovery of the U.S. Pat. No. 3,828,854 invention, it had been generally believed that a mud acid solution would not be effective unless it contained enough strong acid (e.g., HCl) to provide a very low pH (of significantly less than 1). The clay-dissolving capabilities of the mud acid solutions of the 854 process demonstrated that the pH of a mud acid fluid could be initially near 7 and that such a fluid could dissolve significant amounts of clay or silica without the pH ever becoming less than about 2, and often remaining above about 4.

The E. A. Richardson U.S. Pat. No. 3,889,753 describes a discovery that, in a buffered mud acid fluid, the rate of silica dissolution can be retarded (more than the amount of the dissolution is retarded) by buffering the pH at a relatively high value. That patent describes "buffer-regulated" mud acid solutions comprising aqueous solutions of a weak acid, a weak acid salt and a fluoride salt, which solutions are capable of dissolving significant amounts of clay while maintaining pH's as high as about 4.9 to 5.2.

Our copending patent application, Ser. No. 754,143, filed Dec. 27, 1976, describes a discovery that, in a buffer-regulated mud acid solution of a weak acid, a weak acid salt, and a fluoride salt of the type described in the U.S. Pat. No. 3,889,753, the clay-dissolving capability can be increased by adding an aminopolyacetic acid salt chelating or complexing agent.

SUMMARY OF THE INVENTION

The present invention relates to improving a well treating process in which a stream of fluid which contains at least one portion, comprising a siliceous material-dissolving aqueous liquid solution or dispersion, of ammonium fluoride or ammonium bifluoride and at least one relatively slowly reactive acid-yielding material capable of converting the fluoride salt to hydrogen fluoride, is flowed from a surface location to a subterranean location having a temperature above about 180° F to there dissolve a siliceous material. The improvement comprises using, as the slowly reactive acid-yielding material, an ester of a 1 to 5 carbon atom aliphatic alcohol and a 2 to 5 carbon fatty acid, and dissolving in the solution or dispersion an amount of aminopolyacetic acid salt chelating or complexing agent sufficient to increase the clay-dissolving capability of the solution or dispersion.

DESCRIPTION OF THE INVENTION

Figure 1:
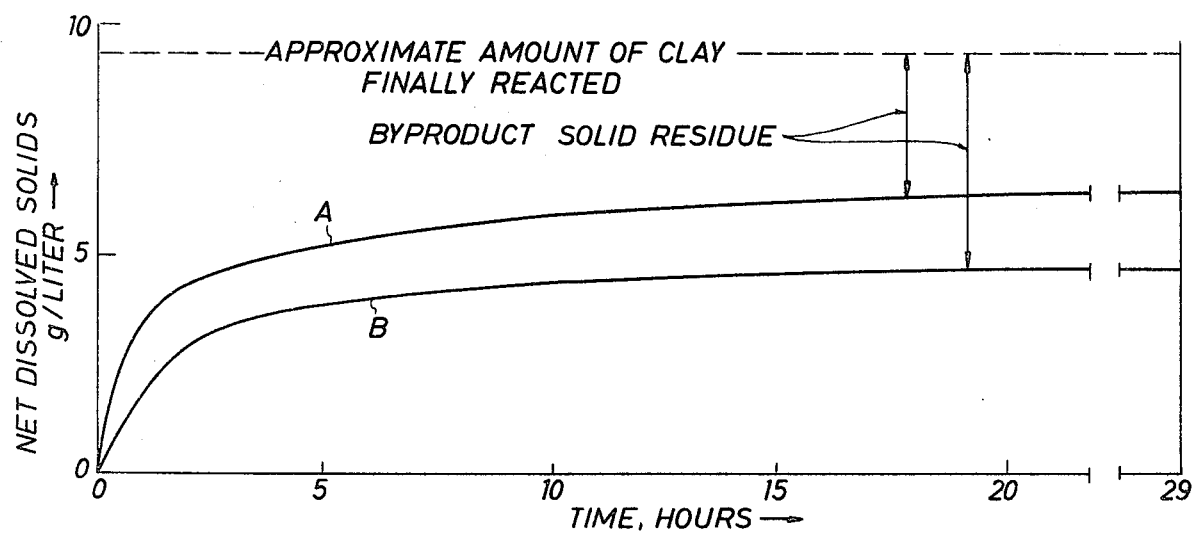
FIG. 1 is a graph of the amount of clay dissolved with time by self-generating mud acid fluids of different compositions.

The present invention is, at least in part, premised on the following discovery. In a high temperature applicable self-generating mud acid liquid solution or dispersion of fluoride salt and 1 to 5 carbon atom aliphatic alcohol ester of 2 to 5 carbon fatty acid, the inclusion of an aminopolyacetic acid salt chelating agent provides an unobviously beneficial result.

In view of long duration of tests in the presence of excess clay and absence of chelating agent, it now appears that such high temperature formulations of self-generating mud acid fluids approach an equilibrium with respect to dissolving solid siliceous materials. As the equilibrium is approached, solid products appear to be forming nearly as rapidly as any solid siliceous materials are dissolving. As identified by x-ray diffraction, such products include:

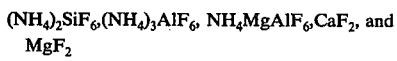

And, it now appears that by complexing the cations, $Al^{3+}$, $Mg^{2+}$, and $Ca^{2+}$, in soluble form, with an aminopolyacetic acid salt, a significant increase in the net dissolved solids can be obtained.

The aqueous liquids used in the present chelating self-generating mud acids can be pure water or substantially any relatively dilute aqueous liquid that is compatible with fluoride salts, weak acids, weak acid salts, and the acidification reaction products of hydrogen fluoride and siliceous materials. Such aqueous liquids can advantageously contain additives such as corrosion inhibitors, wetting agents, detergents, oil solvents, oil and water mutual solvents, water-thickening agents, suspended particles (such as fracture propping particles, or sand or gravel pack-forming particles) and can contain additives such as those conventionally utilized in forming and/or acidizing fractures or sand packs, or gravel packs, or the like. Preferably the aqueous liquids comprise water or relatively dilute and soft saline solutions. Such solutions in which any dissolved salts consist essentially of ammonium salts are particularly preferred.

Fluoride salts suitable for use in the present invention comprises substantially any relatively water soluble ammonium fluoride salts which are at least substantially free of any cations other than ammonium ions. The concentration of cations other than ammonium ions should be low relative to the tendency for such cations to form insoluble fluosilicates. Ammonium fluoride and ammonium bifluoride are particularly suitable. Where ammonium bifluoride is used, it is preferable to add sufficient ammonia or ammonium hydroxide to provide substantially equivalent proportions of ammonium and fluoride ions.

In the mud acid fluids of the present invention, the alcohol components of the organic esters are preferably relatively highly water-soluble alcohols (e.g., methyl or ethyl alcohol). The fatty acids are preferably those of relatively high solubility (e.g., acetic or propionic acid).

As disclosed in the U.S. Pat. No. 3,828,854, the concentrations of the fluoride salt and organic ester can be varied widely. It is generally desirable that the ester be present in a slight stoichiometric excess relative to the fluoride salt (e.g., a ratio of from about 1.5 to 2.5 of ester per mole of fluoride salt).

As discussed in the U.S. Pat. No. 3,828,854, it is desirable to ensure that the concentration of fluoride available for the formation of hydrofluoric acid in the acidic liquid formed by the ester hydrolysis be kept below about 5% by weight, during any period in which the maintaining of a relatively high pH is an important factor.

The adjustment of the composition of the present mud acid fluids and the rate at which they are flowed into the well or reservoir formations, in order to ensure that a clay in such a location will be contacted by a clay-dissolving fluid, can utilize various procedures. Since siliceous materials can be dissolved by the present fluids while the hydrofluoric acid is being formed, as well as being dissolved by such fluids after the hydrolysis of the ester has released a mixture of fatty and hydrofluoric acids, it is only necessary to ensure that the fluid is or will be in contact with the siliceous materials to be dissolved while the hydrofluoric acid is being formed or after some or all of it has been formed.

As typified by fluids containing ammonium fluoride, methyl acetate and diammonium ethylenediaminetetraacetic acid, the present fluids are particularly suitable for use in reservoirs having temperature of from about 180° to 240° F, based on the times required for the reaction of 87.5% of the ester and economically desirable shut-in times for acidization treatment. In addition, as known to those skilled in the art, since the injection of fluids into a formation during an acidization treatment can readily be arranged to exert a cooling effect in the order of 10° to 20° F, depending on pumping rate and depth, the present fluids can readily be utilized in reservoirs having temperatures as high as about 250° F.

In general, substantially any aminopolyacetic acid salt chelating or complexing agent, which salt is at least substantially free of any cations other than ammonium, can be used. Those which are at least substantially analogous to EDTA (ethylenediaminetetraacetic acid) with respect to the solubility of their polyvalent metal-chelating complexes are preferred. Examples of such chelating agents include such ammonium salts of ethylenediaminetetraacetic acid, N-hydroxyethylaminodiacetic acid, diethylenetriaminepentaacetic acid, nitrilotriacetic acid, and the like. Such salts of ethylenediaminetetraacetic acid (EDTA) are preferred, and can be formed in situ by dissolving the acid in an ammonium hydroxide-containing aqueous solution.

FIG. 1 shows the results of typical tests of the amount of sodium bentonite dissolved with time by different self-generating mud acid fluids. In each case an excess of the sodium bentonite was suspended in the mud acid fluid at a temperature of 230° F. The curves show the net amount of clay that was dissolved in grams per liter, the approximate amount of clay that finally reacted and the magnitudes of the byproduct solid residues. Those amounts were determined by x-ray diffraction and gravimetric techniques. Curve A relates to an aqueous solution containing 1.25 moles per liter methyl acetate, 1.0 mole per liter ammonium fluoride, and 0.1 mole per liter of the diammonium salt of EDTA (ethylenediaminetetraacetic acid). Curve B relates to a solution which is the same except for the omission of the EDTA. It is apparent that the incorporation of the EDTA caused a significant increase in the level of net dissolved siliceous material.

Figure 2:
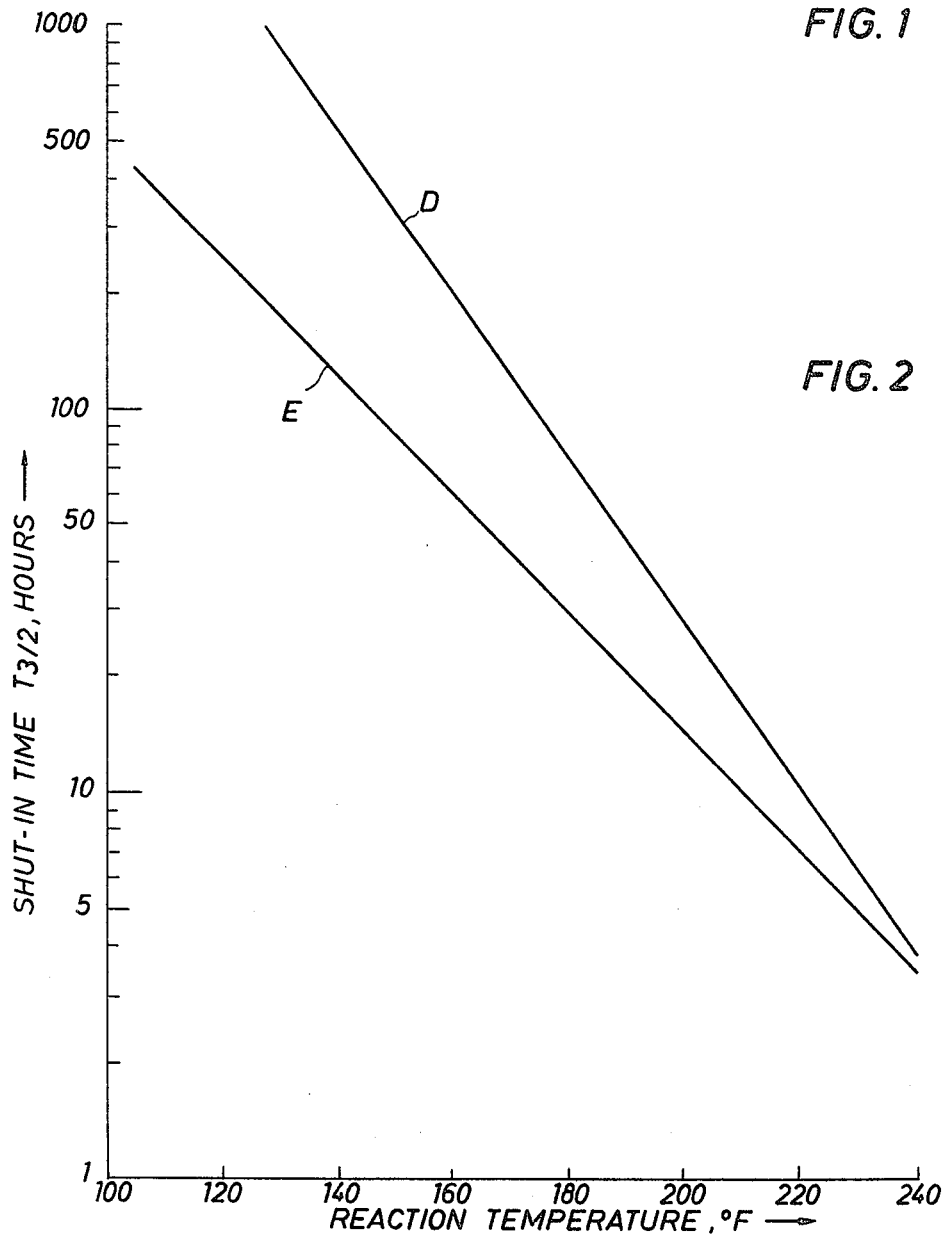
FIG. 2 is a graph of the variations with reaction temperature of the times required for the reaction of 87.5% of the ester in self-generating mud acid fluids of various compositions.

FIG. 2 shows graphs of the shut-in times $T_{3/2}$ (or the time required for reaction of 87.5% of the ester) as a function of temperature for different self-generating mud acid fluids. Curve D relates to an aqueous solution of 1.25 moles per liter of methyl acetate and 1.0 mole per liter ammonium fluoride. Curve E relates to an aqueous solution of 1.25 moles per liter methyl acetate, 1.0 mole per liter ammonium fluoride, and 0.1 mole per liter of the diammonium salt of EDTA. The curves indicate that the presence of EDTA increases the rate of ester hydrolysis, in addition to reducing the amount of solids precipitated. However, it should be noted that the EDTA-containing mud acid fluid is sufficiently different from the analogous EDTA-free fluid, to provide an improved fluid for use at the higher temperatures. Note that the shut-in time for the EDTA-containing fluid (Curve E) is 29 hours at 180° F and 3.4 hours at 240° F. In view of the cooling effects available by generally feasible pumping rates and the like, it is apparent that such an EDTA-containing solution is suitable for use in reservoirs at temperatures ranging from about 180° to 250° F.

What is claimed is:

1. In a well treating process in which a stream of fluid containing at least one portion comprising a siliceous material-dissolving aqueous liquid solution or dispersion of ammonium fluoride or ammonium bifluoride and at least one relatively slowly reactive acid-yielding material capable of converting the fluoride salt to hydrogen fluoride is flowed from a surface location into a subterranean formation having a temperature exceeding about 180° F to there dissolve a siliceous material while having a pH which is initially near 7 and never becomes less than about 2, wherein said aqueous liquid is pure water or a relatively dilute and soft saline solution in which any dissolved salts consist essentially of ammonium salts the improvement comprising:

using as said slowly reactive acid-yielding material an ester of a 1 to 5 carbon atom aliphatic alcohol and a 2 to 5 carbon atom fatty acid; and dissolving in said aqueous liquid solution or dispersion an amount of from about 0.5 to 1.5 moles per liter of an ammonium salt of ethylenediaminetetraacetic acid which is sufficient to increase the siliceous material-dissolving capability of the solution or dispersion.

2. The process of claim 1 in which the ester used is an ester of acetic acid.

3. The process of claim 1 in which the ester used is methyl acetate.

* * * * *